United States Patent
Caringella et al.

(10) Patent No.: US 7,343,672 B2
(45) Date of Patent: Mar. 18, 2008

(54) FASTENING SYSTEM FOR ATTACHING METAL STUDS TO METAL TRACK

(75) Inventors: Anthony R. Caringella, Norridge, IL (US); Donald Buytaert, Huntley, IL (US); Donald L. Van Erden, Wildwood, IL (US)

(73) Assignee: Illinois Tool Works Inc., Glenview, IL (US)

( * ) Notice: Subject to any disclaimer, the term of this patent is extended or adjusted under 35 U.S.C. 154(b) by 144 days.

(21) Appl. No.: 10/925,475

(22) Filed: Aug. 24, 2004

(65) Prior Publication Data

US 2006/0043142 A1    Mar. 2, 2006

(51) Int. Cl.
*B23P 19/00* (2006.01)

(52) U.S. Cl. .................. 29/798; 29/809; 29/811.2; 29/816; 29/818; 411/442; 411/491; 411/494; 411/903

(58) Field of Classification Search ............. 29/897.31, 29/897.34, 432.1, 432.2, 525.01, 525.05, 29/798, 809, 811.2, 816, 817, 252, 243.5, 29/81, 243.58; 411/442, 443, 444, 482, 491, 411/494, 488, 493, 902, 903, 44
See application file for complete search history.

(56) References Cited

U.S. PATENT DOCUMENTS

| | | | |
|---|---|---|---|
| 4,204,622 A | 5/1980 | Smith et al. | |
| 4,213,301 A | 7/1980 | Maier et al. | |
| 4,664,733 A * | 5/1987 | Masago | 156/212 |
| 5,865,585 A | 2/1999 | Sutt, Jr. | |
| 6,000,893 A | 12/1999 | Gabriel et al. | |
| 6,089,808 A | 7/2000 | Sutt, Jr. | |

FOREIGN PATENT DOCUMENTS

EP    0 042 657 A    12/1981

* cited by examiner

*Primary Examiner*—Jermie E. Cozart
(74) *Attorney, Agent, or Firm*—Steven W. Weinrieb

(57) ABSTRACT

A new and improved fastening system for attaching relatively thin-gauge sheet metal members, such as, for example 14-25 gauge sheet metal members, wherein the power output parameters of the power tool are controlled such that when the driver blade member of the power tool acts upon each one of the brad-type nail fasteners, the brad-type nail fasteners will attain a predetermined velocity value, such as, for example, within the velocity range of 1000-2500 in/sec. Any one of various different types of power tools may be employed, and in addition, various geometrical characteristics of each brad-type fastener are important, such as, for example, the tip geometry, the aspect ratio A/R of the shank member of the fastener, and the use of an adhesive or painted coating upon the external surface areas of the shank member of the fastener. The fasteners preferably comprise dual-width fasteners which exhibit enhanced pull-out resistance values.

29 Claims, 6 Drawing Sheets

FASTENING SYSTEM FOR ATTACHING METAL STUDS TO METAL TRACK

FIELD OF THE INVENTION

The present invention relates generally to fastening systems, comprising tools and fasteners, for connecting, attaching, or fastening different structural components to each other, and more particularly to a new and improved fastening system, comprising a specific type of tool and a specific type of fastener, which has been specifically developed in accordance with the principles and teachings of the present invention in order to readily, easily, and quickly achieve the connection, attachment, or fastening together of metal stud members to metal track members during the construction, installation, or erection of, for example, room wall members within residential, commercial, or industrial building structures.

BACKGROUND OF THE INVENTION

Various different type of tools, and various different types of fasteners, are of course well known and utilized within the building industry in order to accomplish various different construction, installation, or erection operations or procedures, such as, for example, the construction or erection of interior wall stud frameworks, grids, matrices, or the like, and the installation of interior wall board members onto such interior wall stud frameworks, grids, matrices, or the like. Interior wall stud frameworks, grids, matrices, or the like, comprise, for example, a lower track member which may be fabricated from wood or relatively thin gauge metal and which is adapted to be fixedly attached or secured to a floor member which is often fabricated from concrete, an upper track member which may likewise be fabricated from wood or relatively thin gauge metal and which is adapted to be fixedly attached or secured to ceiling members which often comprise wooden beams, joists, or the like, and a plurality of stud members which are adapted to be disposed in vertical planes so as to effectively define support structure for the vertically oriented interior wall board members which will therefore, in turn, define the interior wall structures. The stud members may also be fabricated from relatively thin gauge metal or wood and are adapted to be fixedly attached or secured to the upper and lower track members. The stud members may extend vertically so as to be disposed perpendicular to the upper and lower track members, and they may also extend at angular or parallel orientations with respect to the upper and lower track members so as to effectively define cross-bracing within the stud frameworks, grids, or matrices, or the like.

It can therefore be readily appreciated, depending upon the particular members, comprising the overall stud matrix, framework, grid, or the like, that are to be fixedly attached or secured together, that various different material-to-material connections or interfaces will be defined and will therefore embody various different installation parameters, characteristics, techniques, and the like. For example, it can be appreciated that when the lower track members are to be fixedly attached or secured to the floor member, wood-to-concrete or metal-to-concrete material-to-material connections or interfaces will be defined, whereas when the upper track members are to be fixedly attached or secured to the ceiling members, wood-to-wood or metal-to-wood material-to-material connections or interfaces will be defined. Still further, when the stud members are to be fixedly attached or secured to the upper and lower track members, wood-to-wood, metal-to-wood, or wood-to-metal material-to-material connections or interfaces will be defined. Accordingly, it can be appreciated still further that, in view of the various different material-to-material connections or interfaces defined between the various different structural members comprising or defining the overall stud framework, grid, matrix, or the like, various different power tools, characterized, for example by means of various different power levels, and various different fasteners, characterized, for example, by various different structural features, will be used in order to fixedly attach or secure the various different structural members together.

More particularly, it is to be noted further, in connection with the fixation or the securing of various different structural members to other different structural members, such as, for example, the fixation or the securing of the relatively thin gauge metal upper and lower track members to the floor and ceiling members, as well as the fixation or the securing of the relatively thin gauge metal studs to the relatively thin gauge metal upper and lower track members, that various different options are available to construction and installation personnel, operators, workmen, or the like, in connection with the particular tools and fasteners to be selected in order to in fact achieve the installation, construction, or erection of the aforenoted interior wall structure frameworks, grids, matrices, or the like, comprising such upper and lower track members, and the interconnected stud members. For example, different tools are currently available upon the market which are powered by means of different power sources and which generate different power levels, that is, the tools may comprise impulse or combustion-powered tools, pneumatically-powered tools, powder technology tools, electrically-powered tools, and the like. In addition, different fasteners are currently available upon the market which are designed to be used in conjunction with particularly powered tools or implements. For example, various different nails, brads, pins, or the like, may be utilized as a result of being installed by means of suitable nail guns, or the like, or alternatively, various different threaded screw-type fasteners may be utilized as a result of being installed by means of suitable rotary drive tools.

Important criteria to be considered in connection with the selection of specific tools and fasteners for performing, accomplishing, and achieving particular installation, construction, or erection operations, comprise the speed and ease of installation of the fasteners, the pull-out resistance of the fasteners, and the maintenance of the structural integrity of the various different structural components comprising the framework, grid, or matrix. Speed of installation is an important factor because enhanced speed of installation directly affects a contractor's labor costs. Ease of installation is likewise an important factor because facilitating the installation of the fasteners is less fatiguing for the installation or construction personnel, operators, or workmen. Structural integrity of the various different structural components comprising the framework, grid, or matrix is submitted to be self-evident in that if the structural integrity of the various different structural components defining or comprising the framework, grid, or matrix is in fact compromised during installation, construction, or erection of the framework, grid, or matrix, then the structural integrity and service life of the resulting framework, grid, or matrix would obviously be adversely or deleteriously affected.

These factors are particularly important in connection with the installation of relatively thin gauge metal structural components. The reason for this is that it is relatively difficult to properly install fasteners within relatively thin gauge sheet metal structural components, such as, for example, the relatively thin gauge metal studs and the relatively thin gauge metal upper and lower track members, so as to install and connect the relatively thin gauge metal upper and lower track members to the floor and ceiling members, as well as to install and connect the relatively thin gauge metal studs to the relatively thin gauge metal upper and lower track members. When, for example, fasteners are installed within relatively thin gauge sheet metal components by means of suitable nail-type installation guns or the like, care must be taken to properly control the power level of the installation tools. More particularly, if the power level of the installation tool is too low, the fasteners will not be able to be properly driven into the relatively thin-gauge sheet metal comprising the stud and track members. Alternatively, if the power level of the installation tool is too high, the relatively thin gauge sheet metal structural components may be damaged, and in addition, the holes generated within the relatively thin gauge sheet metal components may be overly large whereby the holding strength and pull-out resistance of the fasteners will be significantly compromised.

Accordingly, a need exists in the art for a new and improved fastening system for attaching relatively thin gauge sheet metal stud members to relatively thin gauge sheet metal track members in a relatively fast and easy manner without adversely or deleteriously affecting the structural integrity of the relatively thin gauge sheet metal stud members or the relatively thin gauge sheet metal track members.

SUMMARY OF THE INVENTION

The foregoing and other objectives are achieved in accordance with the teachings and principles of the present invention through the provision of a new and improved fastening system for attaching relatively thin gauge sheet metal stud members to relatively thin gauge sheet metal track members. In particular, the fastening system comprises a nail-gun type power tool, and brad-type nail fasteners. The particular power output parameters or characteristics of the power tool are controlled or predetermined such that when the driver blade member of the power tool acts upon each one of the brad-type nail fasteners, the brad-type nail fasteners will attain a predetermined velocity value. It is noted that any one of various different types of power tools may be employed, that is, impulse powered tools, pneumatically powered tools, powder-technology powered tools, electrically-powered tools, or the like, as long as the predetermined power output levels are achieved. In addition, it is also noted that various geometrical characteristics of each brad-type nail fastener are critically important. It is noted, for example, that the tip region of each brad-type nail fastener has a chisel-type configuration which is important in that the same will readily pierce or penetrate the relatively thin gauge sheet metal, from which the track and stud members are fabricated, while generating maximized interference or interaction with the relatively thin gauge sheet metal. This interference or interaction between the brad-type nail fastener and the relatively thin gauge sheet metal causes diametrically opposed metal tangs to be generated upon the relatively thin gauge sheet metal as each brad-type nail fastener pierces or penetrates the relatively thin gauge sheet metal.

In addition, the cross-sectional geometrical configuration of the shank portion of each brad-type nail fastener is substantially oval-shaped, with substantially planar sides and arcuate ends, and in this manner, each brad-type nail fastener has an aspect ratio A/R, which is the ratio of the cross-sectional width dimension of each brad-type nail fastener shank portion with respect to the cross-sectional height dimension of each brad-type nail fastener shank portion, wherein the aspect ratio is >1. Alternatively, the aspect ratio A/R may be considered to be the ratio of the cross-sectional height dimension of each brad-type nail fastener shank portion with respect to the cross-sectional width dimension of each brad-type nail fastener shank portion, in which case the aspect ratio would be <1.

Accordingly, during the piercing or penetration of each brad-type nail fastener within the relatively thin gauge sheet metal from which the track and stud members are fabricated, particularly by means of the specific tip geometry of each brad-type nail fastener, the relatively large width dimension of the brad-type nail will tend to stretch the metal material, comprising the relatively thin gauge sheet metal of the stud and track members, in the widthwise or transverse direction, while the tangs, formed or generated within the relatively thin gauge sheet metal as a result of the piercing or penetration of the relatively thin gauge sheet metal by means of the chisel-tip portions of the brad-type nail fasteners, will tend to engage and grab the planar sides, of each brad-type nail fastener shank portion, which are disposed diametrically opposite each other along the height dimension of each brad-type nail fastener shank portion. This interaction between the tangs of the relatively thin gauge sheet metal and the planar sides of the shank portions of the brad-type nail fasteners enhances the holding power or pull-out resistance values or characteristics of the brad-type nail fasteners fixedly installed within the relatively thin-gauge metal track and stud members of the wall framework, grid, matrix, or the like.

Still yet further, additional brad-type nail fasteners, having significantly different cross-sectional configurations, are also contemplated in accordance with the principles and teachings of the present invention. For example, in lieu of a single brad-type nail fastener, a dual brad-type nail fastener having, for example, a width dimension and an effective aspect ratio which are effectively twice as large as those characteristic of the aforenoted single brad-type nail fastener, may likewise be used. More particularly, such dual brad-type nail fastener may comprise, for example, a brad-type nail fastener having a single head portion, a single chisel-configured tip portion, but twice the width dimension as the single brad-type nail fastener, or a brad-type nail fastener having a single head portion, a dual chisel-configured tip portion, and twice the width dimension as the single brad-type nail fastener, or a brad-type nail fastener having a single head portion, a width dimension which is twice that of the single brad-type nail fastener, and a dual chisel-configured tip portion with a longitudinal or axially extending groove formed within the external shank portion of the fastener whereby the same effectively simulates a pair of end-to-end single brad-type nail fasteners, or lastly, a truly effective dual brad-type nail fastener comprising dual heads with dual or separate end-to-end single brad-type nail fastener shank portions, with separate chisel-configured tip portions, adhesively bonded together. In order to discharge any of these latter dual brad-type nail fasteners, the driver mechanism or the driver blade member of the particular power tool is effectively modified so as to have a width dimension which extends over or spans the dual width dimensions of the brad head portions so as to properly interface with the dual brad-type nail fasteners and thereby properly fire and discharge the same from the nail fastener guns.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 3 is a cross-sectional view of a plurality of brad-type fasteners which are to be utilized within the nail-gun type power tool, as disclosed within FIG. 1, wherein the unique, substantially oval-shaped cross-sectional configuration, defining a width-to-height aspect ratio A/R of >1, or considered alternatively, a height-to-width aspect ratio A/R of <1, of each one of the brad-type fasteners is disclosed whereby, when each one of the brad-type fasteners is driven into the relatively thin gauge metal track and relatively thin gauge metal stud members, the oval-shaped brad-type fasteners will be able to properly pierce and penetrate the relatively thin gauge metal track and relatively thin gauge metal stud members so as to effectively stretch, in the widthwise direction, the relatively thin gauge sheet metal from which the relatively thin gauge metal track and the relatively thin gauge metal stud members are fabricated, and simultaneously cause the generation of tang members within the relatively thin gauge metal track and the relatively thin gauge metal stud members which will tend to engage and grab the substantially planar sides of the brad-type fastener, which are disposed diametrically opposite each other in the height-wise direction, so as to enhance the holding power and pull-out resistance values or characteristics of the brad-type fasteners with respect to the relatively thin gauge metal track and the relatively thin gauge metal stud members;

DETAILED DESCRIPTION OF THE PREFERRED EMBODIMENT

Figures 1, 2, 3, 4:
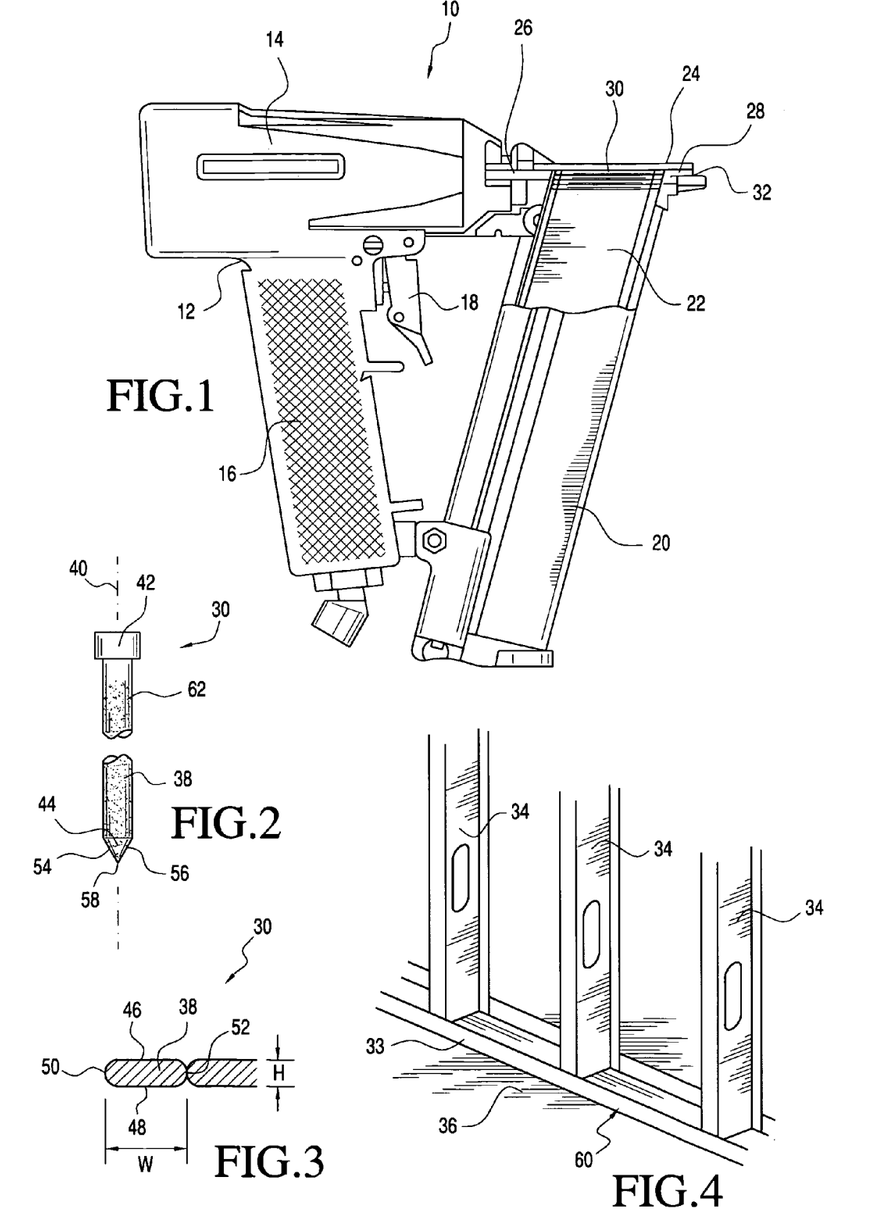
FIG. 1 is a side elevational view of a nail gun-type power tool for driving fasteners, such as, for example, brad-type nail fasteners arranged within a collated strip, into relatively thin gauge metal track and relatively thin gauge metal stud members in accordance with the principles and teachings of the present invention.
FIG. 2 is a side elevational view of a brad-type nail fastener which is to be utilized within the nail-gun type power tool, as disclosed within FIG. 1, whereby the brad-type nail fasteners are characterized by means of a predetermined aspect ratio and are uniquely provided with a chisel tip configuration for piercing and penetrating relatively thin gauge metal track and relatively thin gauge metal stud members in accordance with the principles and teachings of the present invention.
FIG. 4 is a perspective view showing the fixed interconnection of a plurality of vertically oriented stud members, fabricated from relatively thin-gauge sheet metal, to a horizontally oriented track member, also fabricated from relatively thin-gauge sheet metal, which is adapted to be fixedly connected to a floor member, which may comprise concrete, in order to define with the track member a framework structure upon which wall board members may be secured so as to define interior wall members within a residential, commercial, or industrial location.

Referring now to the drawings, and more particularly to FIG. 1 thereof, a nail-gun type power tool, for driving fasteners, such as, for example, brads arranged within a collated strip, as will be more fully discussed shortly hereafter, into relatively thin gauge metal track and relatively thin gauge metal stud members, in accordance with the principles and teachings of the present invention, is disclosed and is generally indicated by the reference character 10. More particularly, it is seen that the power tool 10 comprises an integral housing 12 which has a power drive mechanism, not shown, disposed within an upper housing section 14, while a handle member 16 is integrally connected to the upper housing section 14 so as to be comfortably grasped by means of operator personnel. A trigger mechanism 18 is operatively disposed upon the handle member 16 for operatively controlling the activation of the power drive mechanism, not shown, disposed within an upper housing section 14, and it is seen that a fastener magazine 20, for housing a collated strip of brad-type fasteners 22, has a lower end portion thereof fixedly connected to a lower end portion of the handle member 16, while an upper end portion of the magazine 20 is operatively connected to a nosepiece portion 24 of the power tool 10.

A driver blade member 26, which is operatively connected to the power drive mechanism, not shown, disposed within the upper housing section 14, is adapted to be reciprocally movable within a channel portion 28 of the nosepiece portion 24 of the power tool 10, and in this manner, when an uppermost or endmost one of the brad-type fasteners 30 is disposed within the channel portion 28 of the nosepiece portion 24 of the power tool 10, and when the driver blade member 26 is moved forwardly, or to the right, as viewed in the drawing, as a result of the firing of the power drive mechanism, not shown, disposed within the upper housing section 14 of the power tool 10, the uppermost or endmost one of the brad-type fasteners 30 will be discharged through an aperture 32 defined within the nosepiece portion 24 of the power tool 10. As will be noted further in detail hereinafter, it is also noted at this junction that the power tool 10 may comprise any one of various different types of power tools, such as, for example, impulse-powered tools, pneumatically powered tools, powder-technology powered tools, electric-powered tools, or the like.

With reference being made to FIGS. 2-4, the particular structure characteristic of each individual brad-type fastener 30, which renders the same uniquely useable in connection with the power tool 10, as disclosed within FIG. 1, for penetration into relatively thin-gauge metal track and relatively thin-gauge metal stud members 33,34, as disclosed within FIG. 4, in order to, for example, fixedly connect relatively thin-gauge metal track members 33 to a floor member 36, which may be fabricated from concrete, as well as to fixedly connect relatively thin-gauge metal stud members 34 to the relatively thin-gauge metal track members 33, will now be discussed. More particularly, it is seen that each one of the brad-type fasteners 30 comprises a shank member 38 having a longitudinal axis 40, a head member 42 defined upon a first upper end portion of the shank member 38, and a pointed tip member 44 defined upon a second opposite lower end portion of the shank member 38. As can best be appreciated from FIG. 3, it is seen that the shank member 38 has a substantially oval-shaped cross-sectional configuration wherein such cross-sectional configuration is defined by means of oppositely disposed, substantially planar, parallel side portions 46,48, and a pair of oppositely disposed arcuate end portions 50,52 which of course integrally interconnect the parallel, planar side portions 46,48. This unique cross-sectional configuration of the shank member 38 therefore further defines or provides the shank member 38 of each brad-type fastener 30 with an aspect ratio A/R, which is defined as the ratio of the widthwise extent W of the shank member 38 to the heightwise extent H of the shank member 38, which is >1, such as, for example, 1.13. Alternatively, of course, depending upon the angular orientation of the brad-type fastener 30, and the shank member 38 thereof, it can be appreciated that the aspect ratio A/R of the shank member 38 of the brad-type fastener 30 can be defined as the ratio of the heightwise extent H of the shank member 38 to the widthwise extent W of the shank member 38, wherein the aspect ratio A/R would then be <1, or using the same example, 0.885.

Referring back to FIG. 2, it is seen that the pointed tip portion 44 has a substantially chisel-shaped configuration as defined by means of sides or facets 54,56 which converge together from the oppositely disposed planar side portions 46,48 of the shank member 38 so as to define a point 58 which may be asymmetrically located within the plane of one of the oppositely disposed end portions 50,52 of the shank member 38. It is therefore to be noted, as a result of the specifically described structure characteristic of the shank member 38 of each brad-type fastener 10, as well as the specifically described structure characteristic of the chisel-shaped pointed tip portion 44 of each brad-type fastener 30, that when any particular one of the brad-type fasteners 30 is driven into one of the relatively thin-gauge track or stud members 33,34 by means of the power tool 10, the pointed tip portion 44 of the brad-type fastener 30 will pierce or penetrate the relatively thin-gauge sheet metal, from which the track and stud members 33,34 are fabricated, and accordingly, several structural changes will effectively be caused to occur within the relatively thin-gauge sheet metal. More particularly, as a result of the piercing or penetration of the relatively thin gauge sheet metal by means of the chisel-shaped tip portions 44 of the brad-type nails or fasteners 30 so as to form holes within the relatively thin-gauge sheet material, and the subsequent insertion through such holes formed within the relatively thin-gauge sheet metal material, the relatively thin-gauge sheet metal material will effectively be sliced open within the vicinity of such holes formed within the relatively thin-gauge sheet metal material, whereby tang or barb members will be formed within the vicinity of the aforenoted holes. In addition, the relatively large width dimension W of the shank member 38 of each brad-type nail or fastener 30 will tend to stretch the relatively thin-gauge sheet metal material, comprising the relatively thin gauge sheet metal material of the track and stud members 33,34, in the widthwise or transverse direction, while the tangs, formed or generated within the relatively thin-gauge sheet metal material, will tend to engage and grab the planar sides 46,48 of the shank member 38 of each brad-type nail or fastener 30. This interaction defined between the tangs of the relatively thin-gauge sheet metal material comprising the track and stud members 33,34, and the planar sides 46,48 of the shank members 38 of the brad-type nails or fasteners 30, enhances the holding power or pull-out resistance values or characteristics of the brad-type nail fasteners 30 fixedly installed within the relatively thin-gauge metal track and stud members 33,34 of the wall framework, grid, matrix, or the like, 60.

Continuing still further, it has been noted that while the power tool 10, as disclosed within FIG. 1, may comprise any one of various different types of power tools, that is, impulse-powered, pneumatically-powered, powder technology-powered, electrically-powered, or the like, a critically important feature characteristic of the fastening system of the present invention resides in the power level generated by means of the power tool 10 and as impressed upon the particular brad-type fastener 30 such that the brad-type fastener 30 can properly penetrate the relatively thin-gauge sheet metal material from which the track and stud members 33,34 are fabricated, and yet not damage the relatively thin-gauge sheet metal material as well as not to form oversized holes within the relatively thin-gauge sheet metal material. The relatively thin-gauge sheet metal material comprises, for example, sheet metal material which may be within the range of 14-25 gauge sheet metal material, and therefore in practical terms, the aforenoted power level is a function of the velocity of the brad-type fastener 30, as may be tailored or predetermined with respect to the particular gauge sheet metal material being used, as the same is discharged from the power tool 10.

Figure 5:
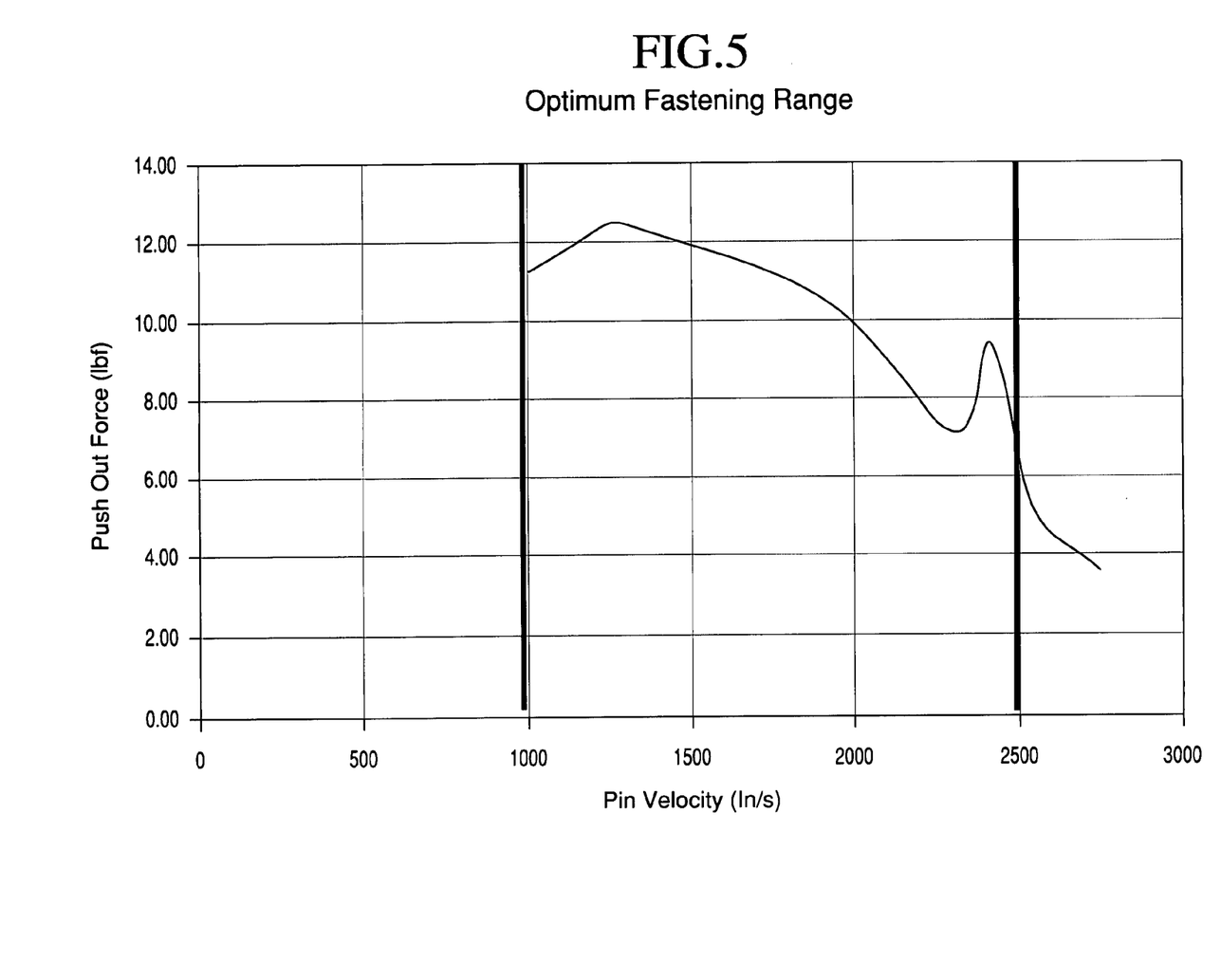
FIG. 5 is a graph illustrating pull-out resistance values as a function of the velocity at which the brad-type fastener pins of the present invention are inserted into a particular thin gauge sheet metal component.

An appropriate or suitable velocity value for the brad-type fastener 30, for use in connection with 25 gauge sheet metal material, would be, for example, within the range of 1000-2500 in/sec as illustrated within the graph of FIG. 5 which illustrates push-out force or pull-out resistance as a function of pin velocity. It is to be noted, for example, that if the pin velocity value is less than 1000 in/sec, sufficient penetration of the brad-type fastener pin into the thin gauge sheet metal will not be properly achieved, whereas, conversely, if the pin velocity value is greater than 2500 in/sec, the thin gauge sheet metal will be deformed or damaged whereby the pull-out resistance values for the pins or fasteners would be significantly compromised. As has been noted hereinbefore, the particular pin or fastener velocity values may be somewhat different depending upon the particular gauge thickness of the sheet metal into which the pins or fasteners are being driven. For example, with smaller or lower number gauge sheet metal components, the actual thickness of the sheet metal increases. Therefore, the minimum velocity value, of the pin velocity range as illustrated within the graph of FIG. 5, would be somewhat higher for such lower gauge sheet metal than the illustrated 1000 in/sec in connection with 25 gauge sheet metal. It is noted, however, that the upper velocity value of the pin velocity range as illustrated within the graph of FIG. 5 would remain essentially the same because current statutes or regulations promulgated by, for example, the Federal Government, such as, for example, the Occupational Safety and Health Administration (OSHA) has mandated that the maximum permitted velocity level is, for example, 3000 in/sec.

It is noted still further that in view of the various aforenoted structural features characteristic of the brad-type pin fastener 30 of the present invention, that is, the chisel-shaped pointed tip geometry, the aspect ratio A/R of the shank member 38, and the velocity parameters of the brad-type pin fastener 30, the brad-type pin fasteners 30 need not comprise heat-treated fasteners. In accordance with conventional, PRIOR ART techniques, heat-treated fasteners were desired or required in order to provide such fasteners with a requisite amount of strength in order to ensure that the fasteners could properly pierce or penetrate the various different substrates into which the fasteners were to be driven. However, in view of the aforenoted structural features characteristic of the brad-type pin fasteners 30 of the present invention, such heat-treatment of the fasteners is not required whereby the fasteners can be fabricated or manufactured more economically or on a more cost-effective basis.

Continuing still yet further, it is noted that an additional advantageous feature characteristic of the present invention is the provision of a suitable thermoplastic adhesive coating 62 upon the external surface areas of the shank member 38, wherein the provision of such an adhesive coating 62 serves several purposes. Firstly, when the brad-type fastener 30 is initially fired from the power tool 10 and installed into the track and stud members 33,34, the thermoplastic adhesive coating 62 will tend to become slightly fluid as a result of the heat generated during the installation process. These fluidic properties provide the shank member 38 of the brad-type pin fastener 30 with a predetermined amount of lubricity which effectively reduces the installation drag defined between the inserted fastener 30 and the sheet metal defining the track and stud members 33,34. Upon installation of the fastener 30 within the track and stud members 33,34, the material comprising the thermoplastic adhesive coating 62 will tend to solidify thereby effectively forming an adhesive bond between the fastener 30 and the track and stud members 33,34 so as to thereby significantly increase the holding power or pull-out resistance characteristic of the fasteners 30. Suitable adhesive materials may comprise, for example, NYLOK®, CLIMASEAL®, or the like. In a similar manner, in lieu of the use of the aforenoted thermoplastic adhesive upon the shank portion of the fastener 30, magnetized paint may likewise be coated upon the shank portion 38 of the fastener. The paint can be applied by means of a suitable electro-deposition process and subsequently cured by means of a suitable heat-treatment process. The magnetized paint will effectively form a mechanical bond with the track and stud members 33,34. It is therefore to be noted further that the aforenoted use of the thermoplastic adhesive material, or the magnetized paint, can improve the pull-out resistance values of the fasteners 30 by approximately 25%.

Figure 6:
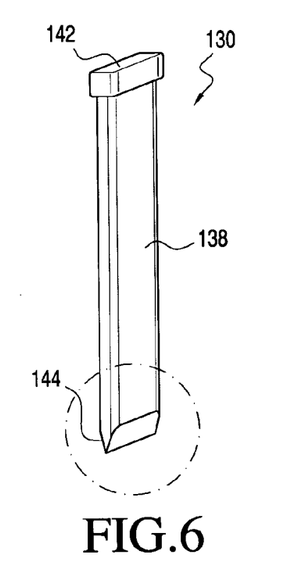
FIG. 6 is a side view of a first embodiment of a new and improved dual brad-type nail fastener having a single head portion, a single chisel-configured tip portion, and a single shank portion but with twice the width dimension as that of the single brad-type nail fastener.
Figure 7:
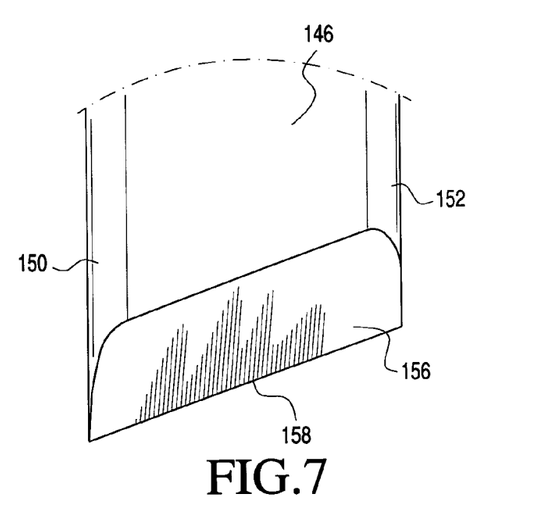
FIG. 7 is a partial, enlarged view of the encircled area of the new and improved dual brad-type nail fastener disclosed within FIG. 6 showing the details of the single tip portion thereof.

With reference now being made to FIGS. 6 and 7, a first embodiment of a new and improved dual brad-type nail or pin fastener is disclosed and is generally indicated by the reference character 130. In view of the overall similarity of the new and improved dual brad-type nail or pin fastener 130 as disclosed within FIGS. 6 and 7, to the new and improved single brad-type nail or pin fastener 30 as disclosed within FIGS. 2 and 3, structural components of the dual brad-type nail or pin fastener 130 which correspond to the structural components of the single brad-type nail or pin fastener 30 will be designated by similar reference characters except that they will be within the 100 series. Accordingly, it is seen that the dual brad-type nail or pin fastener 130 has a single shank portion 138, a single head portion 142, a single chisel-configured pointed tip portion 144 comprising one of the illustrated facets 156 and the tip 158, and while the height dimension of the dual brad-type nail or pin fastener 130, as defined between side 146 of the fastener shank portion 138 and the opposite side thereof, which is not visible, is the same as that of the single brad-type nail fastener as is disclosed within FIGS. 2 and 3, the width dimension of such dual brad-type nail fastener 130, as defined between the opposite arcuate ends 150,152 of the fastener shank portion 138, is twice the width dimension of the single brad-type nail fastener as disclosed within FIGS. 2 and 3. Accordingly, the aspect ratio A/R of the dual brad-type nail fastener 130 is 2.26 as opposed to the aspect ratio A/R of 1.13 characteristic of the single brad-type nail or pin fastener 30 as disclosed within FIGS. 2 and 3.

Figure 8:
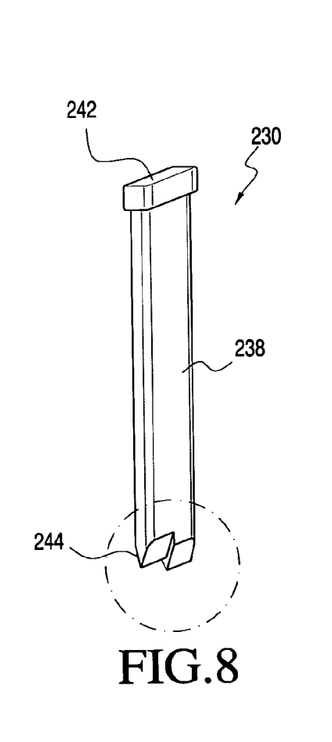
FIG. 8 is a side view of a second embodiment of a new and improved dual brad-type nail fastener having a single head portion, a dual chisel-configured tip portion, and a single shank portion but with twice the width dimension as that of the single brad-type nail fastener.
Figure 9:
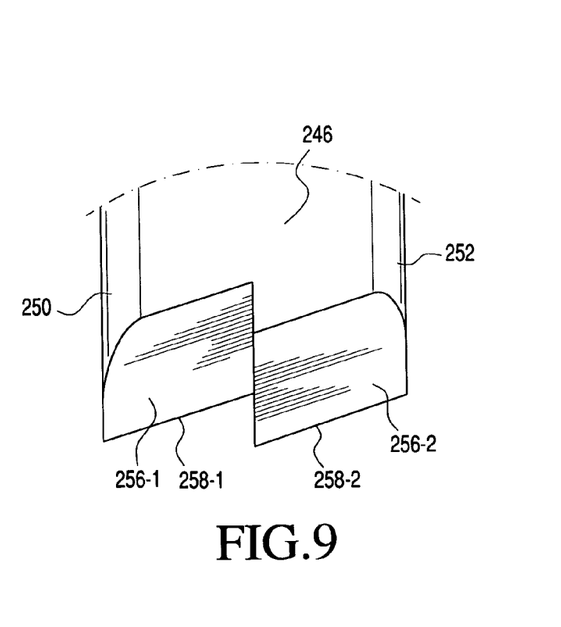
FIG. 9 is a partial, enlarged view of the encircled area of the new and improved dual brad-type nail fastener disclosed within FIG. 8 showing the details of the dual tip portion thereof.

With reference now being made to FIGS. 8 and 9, a second embodiment of a new and improved dual brad-type nail or pin fastener is disclosed and is generally indicated by the reference character 230. In view of the overall similarity of the new and improved dual brad-type nail or pin fastener 230, as disclosed within FIGS. 8 and 9, to the new and improved single brad-type nail or pin fastener 30 as disclosed within FIGS. 2 and 3, as well as the overall similarity of the new and improved dual brad-type nail or pin fastener 230, as disclosed within FIGS. 8 and 9, to the new and improved dual brad-type nail or pin fastener 130 as disclosed within FIGS. 6 and 7, structural components of the dual brad-type nail or pin fastener 230 which correspond to the structural components of the single brad-type nail or pin fastener 30 and the dual brad-type nail or pin fastener 130 will be designated by similar reference characters except that they will be within the 200 series. Accordingly, it is seen that the dual brad-type nail or pin fastener 230 has a single shank portion 238, a single head portion 242, and a single chisel-configured pointed tip portion 244, however, in lieu of the single facet 156 and the single tip 158 as was characteristic of the fastener 130, the fastener 230 comprises dual facets 256-1,256-2 and dual tip portions 258-1,258-2. In addition, it is noted that, as was the case with the fastener 130 as disclosed within FIGS. 6 and 7, while the height dimension of the dual brad-type nail or pin fastener 230, as defined between side 246 of the fastener shank portion 238 and the opposite side thereof, which is not visible, is the same as that of the single brad-type nail fastener as disclosed within FIGS. 2 and 3, the width dimension of such dual brad-type nail fastener 230, as defined between the opposite arcuate ends 250,252 of the fastener shank portion 238, is twice the width dimension of the single brad-type nail fastener as disclosed within FIGS. 2 and 3. Accordingly, again, the aspect ratio A/R of the dual brad-type nail fastener 230 is 2.26 as opposed to the aspect ratio A/R of 1.13 characteristic of the single brad-type nail or pin fastener 30 as disclosed within FIGS. 2 and 3.

Figure 10:
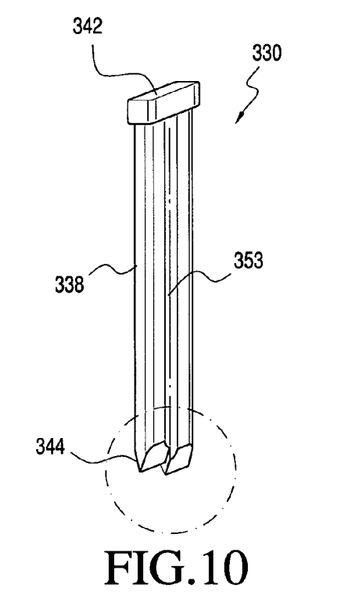
FIG. 10 is a side view of a third embodiment of a new and improved dual brad-type nail fastener having a single head portion, a single shank portion with a width dimension which is twice that of the single brad-type nail fastener, and a double chisel-configured tip portion with a longitudinal or axially extending groove formed within the external shank portion of the fastener whereby the same effectively simulates a pair of end-to-end single brad-type nail fasteners.
Figure 11:
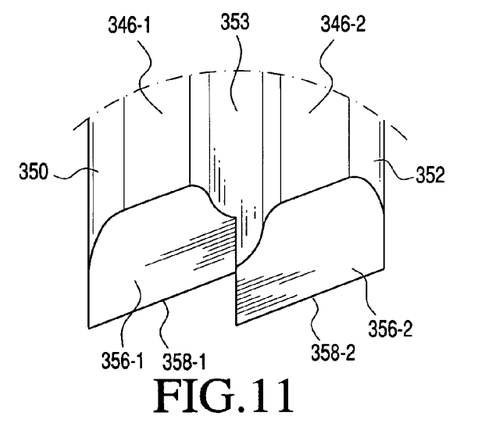
FIG. 11 is a partial, enlarged view of the encircled area of the new and improved dual brad-type nail fastener disclosed within FIG. 10 showing the details of the dual tip portion and the longitudinal or axial groove thereof.

Continuing still further, with reference now being made to FIGS. 10 and 11, a third embodiment of a new and improved dual brad-type nail or pin fastener is disclosed and is generally indicated by the reference character 330. In view of the overall similarity of the new and improved dual brad-type nail or pin fastener 330, as disclosed within FIGS. 10 and 11, to the new and improved single brad-type nail or pin fastener 30 as disclosed within FIGS. 2 and 3, as well as the overall similarity of the new and improved dual brad-type nail or pin fastener 330, as disclosed within FIGS. 10 and 11, to the new and improved dual brad-type nail or pin fasteners 130 and 230 as disclosed within FIGS. 6-9, structural components of the dual brad-type nail or pin fastener 330, which correspond to the structural components of the single brad-type nail or pin fastener 30 and the dual brad-type nails or pin fasteners 130,230, will be designated by similar reference characters except that they will be in the 300 series. Accordingly, it is seen that the dual brad-type nail or pin fastener 330 comprises a single shank portion 338, a single head portion 342, and a single chisel-configured pointed tip portion 344 comprising dual facets 356-1,356-2 and dual tip portions 358-1,358-2, however, the significant difference between the fastener 330 of FIGS. 10 and 11, as opposed to the fastener 230 of FIGS. 8 and 9, resides in the addition of longitudinally or axially oriented grooves 353 formed within the opposite sides of the single shank portion 338, only one of the grooves 353 being visible within the shank side portion 346, whereby each side of the single shank portion 338 is effectively divided into two sections as illustrated at 346-1,346-2.

The significance of providing the longitudinally or axially oriented grooves 353 within the opposite sides of the shank portion 338 is that when the fastener 330 is inserted into the thin-gauge sheet metal components 33,34, some of the aforenoted tangs generated within the thin-gauge sheet metal components 33,34 will become lodged within the grooves 353 thereby enhancing the pull-out resistance characteristics of the fastener 330. It is additionally noted that, as was the case with the fasteners 130,230 as disclosed within FIGS. 6-9, while the height dimension of the dual brad-type nail or pin fastener 330, as defined between side 346 of the fastener shank portion 338 and the opposite side thereof, which is not visible, is the same as that of the single brad-type nail fastener 30 as disclosed within FIGS. 2 and 3, the width dimension of such dual brad-type nail fastener 330, as defined between the opposite arcuate ends 350,352 of the fastener shank portion 338, is likewise twice the width dimension of the single brad-type nail fastener, as disclosed within FIGS. 2 and 3, as was also the case with the fasteners 130,230 as disclosed within FIGS. 6-9. Accordingly, again, the aspect ratio A/R of the dual brad-type nail fastener 330 is 2.26 as opposed to the aspect ratio A/R of 1.13 characteristic of the single brad-type nail or pin fastener 30 as disclosed within FIGS. 2 and 3.

Figure 12:
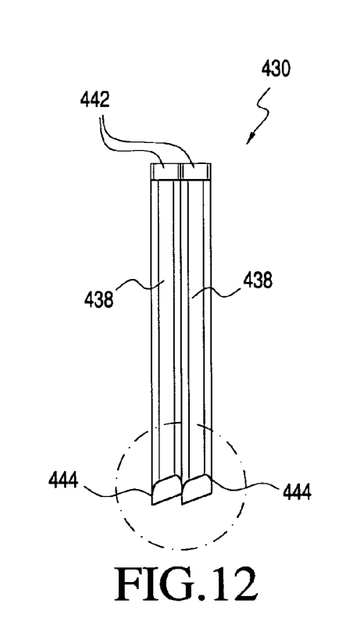
FIG. 12 is a side view of a fourth embodiment of a new and improved dual brad-type nail fastener comprising dual heads and dual end-to-end single brad-type nail fastener shank portions adhesively bonded together and with separate chisel-configured tip portions, whereby the overall or composite width dimension of the dual brad-type nail fastener is twice that of the single, brad-type nail fastener.
Figure 13:
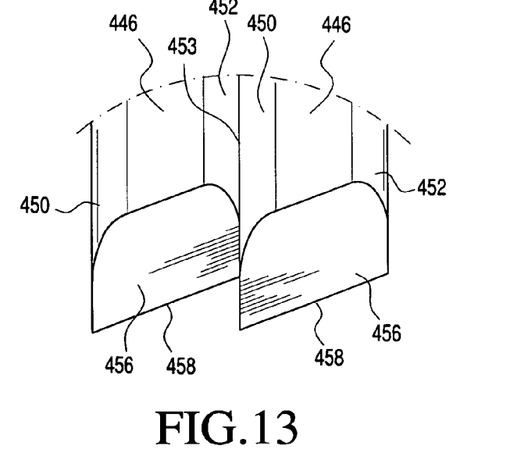
FIG. 13 is a partial, enlarged view of the encircled area of the new and improved dual brad-type nail fastener disclosed within FIG. 12 showing the details of the dual tip portions of the pair of nail fasteners thereof.

With reference lastly being made to FIGS. 12 and 13 in connection with the new and improved structures comprising the fasteners of the present invention, a fourth embodiment of a new and improved dual brad-type nail or pin fastener is disclosed and is generally indicated by the reference character 430. In view of the overall similarity of the new and improved dual brad-type nail or pin fastener 430, as disclosed within FIGS. 12 and 13, to the new and improved single brad-type nail or pin fastener 30 as disclosed within FIGS. 2 and 3, as well as the overall similarity of the new and improved dual brad-type nail or pin fastener 430, as disclosed within FIGS. 12 and 13, to the new and improved dual brad-type nail or pin fasteners 130,230,330 as disclosed within FIGS. 6-11, structural components of the dual brad-type nail or pin fastener 430, which correspond to the structural components of the single brad-type nail or pin fastener 30 and the dual brad-type nails or pin fasteners 130,230,330, will be designated by similar reference characters except that they will be in the 400 series. It is to be initially noted, however, that the dual brad-type nail or pin fastener 430 is significantly different from the dual brad-type nails or pin fasteners 130,230,330 in that the fastener 430 comprises, in effect, two separate brad-type nail or pin fasteners adhesively bonded together. Accordingly, the overall or composite dual brad-type nail or pin fastener 430 is seen to comprise a pair of shank portions 438,438, a pair of head portions 442,442, and a pair of chisel-configured pointed tip portions 444,444 comprising single facets 456, 456, the opposite side facets not being visible, and a pair of tip portions 458,458. Therefore, as was the case with the fastener 330 as disclosed within FIGS. 10 and 11, longitudinally or axially oriented grooves 453 are effectively formed within the opposite sides of the overall fastener 430, that is, between the separate shank portions 438,438, only one of the grooves 453 of course being visible within the shank side portion 346.

Accordingly, as was the case with the fastener 330 as disclosed within FIGS. 10 and 11, the significance of effectively providing the longitudinally or axially oriented grooves 453 within the opposite sides of the fastener 430, and defined at the locus forming the boundary between the shank portions 438,438, is that when the fastener 430 is inserted into the thin-gauge sheet metal components 33,34, some of the aforenoted tangs generated within the thin-gauge sheet metal components 33,34 will become lodged within the grooves 453 thereby enhancing the pull-out resistance characteristics of the fastener 430. Still further, however, in view of the fact that the composite fastener 430 actually comprises two separate fasteners adhesively bonded together which are adapted to be simultaneously driven and inserted into the thin-gauge sheet metal components 33,34, the two fasteners will effectively separate as they are inserted into the thin-gauge sheet metal components 33,34. They will in effect comprise independent entities which are free to rotate around their longitudinal axes as well as to be displaced independently with respect to each other. Accordingly, the shear pattern formed by such fasteners is significantly different from those generated by means of any of the aforenoted fasteners 30,130,230,330.

It is lastly noted that, as was the case of the previously disclosed fasteners 130,230,330 as disclosed within FIGS. 6-11, while the height dimension of the dual brad-type nail or pin fastener 430, as defined between each side 446 of each fastener shank portion 438 and the opposite side thereof, which is not visible, is the same as that of the single brad-type nail fastener 30 as disclosed within FIGS. 2 and 3, the width dimension of such dual brad-type nail fastener 430, as defined between the opposite external arcuate ends 450,452 of the two fastener shank portions 438, 438, is likewise twice the width dimension of the single brad-type nail fastener 30, as disclosed within FIGS. 2 and 3, as was also the case with the fasteners 130,230,330 as disclosed within FIGS. 6-11. Therefore, again, the aspect ratio A/R of the dual brad-type nail fastener 430 is 2.26 as opposed to the aspect ratio A/R of 1.13 characteristic of the single brad-type nail or pin fastener 30 as disclosed within FIGS. 2 and 3.

Figure 14:
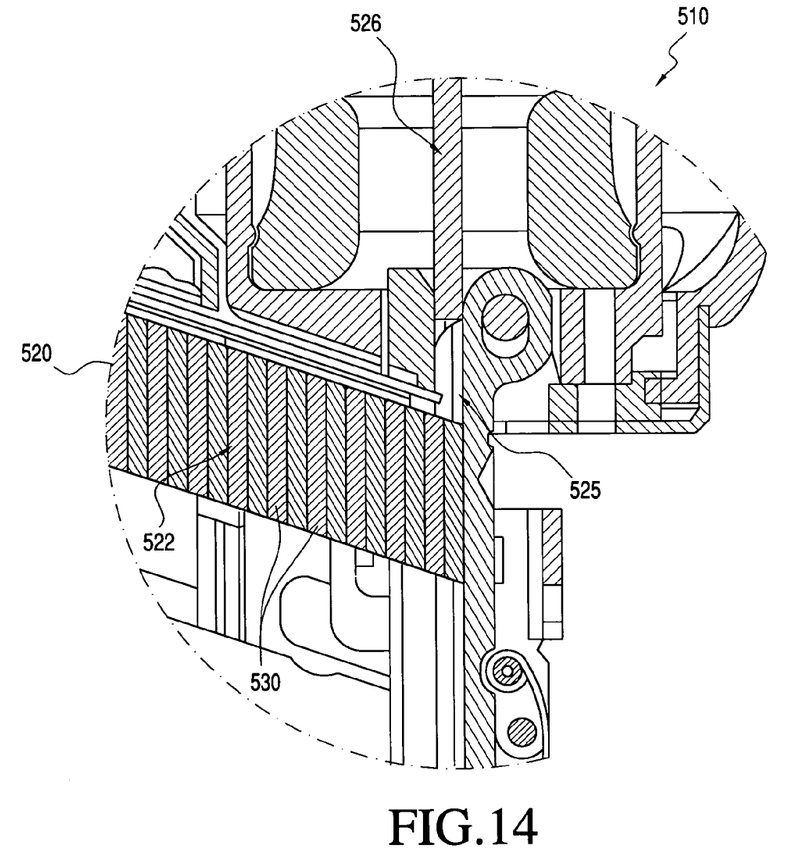
FIG. 14 is a partial view of a fastener magazine section of, for example, a power tool similar to that illustrated within FIG. 1 wherein, for example, the tool is provided with a modified driver mechanism or driver blade which effectively has an enlarged width dimension which extends over or spans the dual width dimensions of the brad head portions of the dual brad-type nail fasteners illustrated within FIGS. 6-13 so as to properly interface with the dual brad-type nail fasteners and thereby properly fire and discharge the same from the nail fastener gun.

With reference now being briefly made to FIG. 14, a partial view of the internal components of a power tool, which may be similar to that of tool 10 but modified accordingly as will be described hereinafter, is disclosed as at 510. It is seen that the tool 510 comprises, for example, a fastener magazine 520 comprising, for example, a plurality of brad-type nail or pin fasteners 530 which may be arranged within a collated array of fasteners 522. Alternatively, the fasteners 530, which may comprise, in effect, any one of the dual fasteners 130,230,330,430, as disclosed in FIGS. 6-13, may be individually disposed within the fastener magazine 520.

The significant modifications made to the fastener tool 510, as compared, for example, to the fastener tool 10 disclosed within FIG. 1, resides in the fact that since the tool 510 must accommodate the dual brad-type nail or pin fasteners 130,230,330,430 as disclosed within FIGS. 6-13, the driver blade passageway 525, within which the leading brad-type nail or pin fastener 130,230,330,430 is disposed, and within which the driver blade mechanism 526 is adapted to be movably driven so as to discharge the leading one of the dual brad-type nail or pin fasteners 130,230,330,430 out from the tool 510, is effectively oversized so as to in fact be capable of accommodating the dual brad-type nail or pin fasteners 130,230,330,430 which, of course, have width dimensions which are twice the width dimension of the single brad-type nail or pin fastener 30. In addition, it is likewise noted that the driver blade mechanism 526 is also effectively oversized such that the forward driving face of the driver blade mechanism 526 can actually contact and engage the oversized single head portions 142,242,342 of the fasteners 130,230, 330, or alternatively, simultaneously contact and engage both of the head portions 442,442 of the individual fasteners comprising the composite fastener 430.

Figure 15:
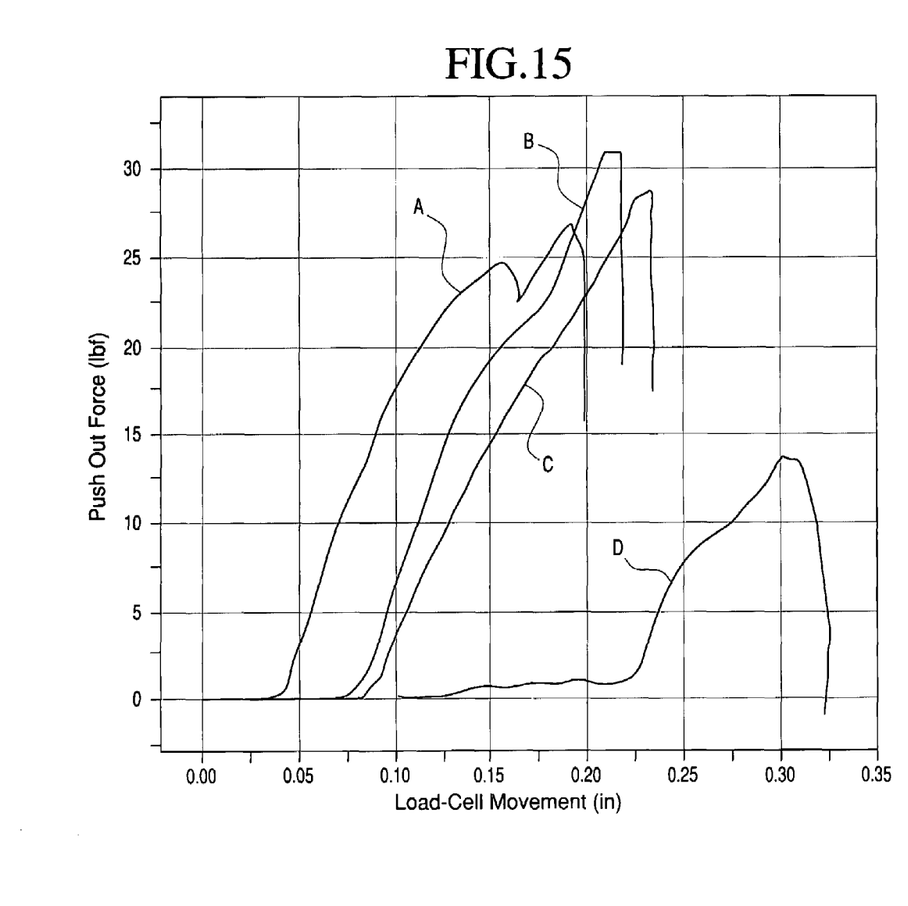
FIG. 15 is a graph illustrating the enhanced pull-out resistance values attained by means of the dual brad-type nail fasteners, as compared to single brad-type nail fasteners, in connection with thin gauge sheet metal.

With reference lastly being made to FIG. 15, there is disclosed a graphical plot illustrating the pull-out resistance of the various fasteners of the present invention as a function of the movement of load-cell test apparatus. The three graphical plots labeled A,B,C comprise graphical plots of three different test results conducted in connection with the dual brad-type nail or pin fasteners 130,230,330, 430, while the graphical plot labeled D comprises a graphical plot characteristic of the single brad-type nail or pin fastener 30 with respect to their insertion into, and their ultimate discharge or pull-out from, the thin-gauge sheet metal material.

As can be appreciated from the various graphical plots that the three plots A,B,C characteristic of the dual brad-type nail or pin fasteners 130,230,330,430 evidence a peak pull-out resistance force of approximately 25-30 lbf, whereas the peak pull-out resistance force characteristic of the single brad-type nail or pin fastener 30 is approximately 13-14 lbf. It can therefore be appreciated that the dual brad-type nail or pin fasteners 130,230,330,430 exhibit a peak pull-out resistance force value which is approximately twice the peak pull-out resistance force value characteristic of the single brad-type nail or pin fastener 30. It is further noted that the peak pull-out resistance force values effectively indicate the force level at which the fasteners will be released or dislodged from the thin-gauge sheet metal materials.

Accordingly, it is seen that after such peak pull-out resistance force values are attained, the pull-out resistance force values are effectively reduced, that is, it is easier to remove or dislodge the fastener from the thin-gauge sheet metal material, however, it is noted that the brad-type nail or pin fasteners 130,230,330,430 still exhibit some residual pull-out force resistance, that is, the pull-out resistance force values for the dual brad-type nail or pin fasteners 130,230, 330,430 are not zero, whereas with the case of the single brad-type nail or pin fastener 30, such is not the case. In the case of the single brad-type nail or pin fastener 30, once the single brad-type nail or pin fastener 30 effectively becomes dislodged from the thin-gauge sheet metal materials, its pull-out resistance force level is effectively zero. It is lastly noted that while the graphical plot D appears to indicate that the pull-out resistance force level values characteristic of the single brad-type nail or pin fastener 30 begin to register at a higher level of load-cell movement than the pull-out resistance force level values characteristic of the dual brad-type nail or pin fasteners 130,230,330,430, this is not actually the case. The graphical plot D has effectively been skewed or automatically repositioned by means of the software operatively associated with the test apparatus so as to clearly illustrate all of the graphical plots, that is, so as not to, for example, intermingle or overlap graphical plot D, characteristic of the single brad-type nail or pin fastener 30, with the graphical plots A,B,C characteristic of the dual brad-type nail or pin fasteners 130,230,330,430.

Thus, it may be seen that in accordance with the principles and teachings of the present invention, there has been disclosed a new and improved fastening system for attaching relatively thin-gauge sheet metal stud members to relatively thin gauge sheet metal track members, or for attaching relatively thin-gauge sheet metal track members to concrete floor members, wherein the power output parameters or characteristics of the power tool are controlled or predetermined such that when the driver blade member of the power tool acts upon each one of the brad-type nail fasteners, the brad-type nail fasteners will attain a predetermined velocity value. It is noted that any one of various different types of power tools may be employed, that is, impulse-powered tools, pneumatically powered tools, powder-technology powered tools, electrically-powered tools, or the like, as long as the predetermined power output levels are achieved. In addition, it is also noted that various geometrical characteristics of each brad-type nail have been shown to be important, such as, for example, the tip geometry, the aspect ratio A/R of the shank member of the fastener, and the use of the adhesive or magnetic paint coatings upon the external surface areas of the shank member of the fastener. Still further, dual-width fasteners, having aspect ratios A/R which are twice that of the aforenoted fastener, exhibit enhanced pull-out resistance values.

Obviously, many variations and modifications of the present invention are possible in light of the above teachings. For example, while the aforenoted disclosure has described the fastening system for use in connection with stud and track members for interior wall structures, the fastening system can likewise be utilized in connection with various heating, ventilation, and air-conditioning (HVAC) or other ductwork applications. It is therefore to be understood that within the scope of the appended claims, the present invention may be practiced otherwise than as specifically described herein.

What is claimed as New and Desired to be Protected by Letters Patent of the United States of America, is:

1. A fastening system for fastening relatively thin-gauge sheet metal members, comprising:
   a plurality of brad-type fasteners to be installed within relatively thin-gauge sheet metal members, wherein each one of said plurality of brad-type fasteners comprises a shank portion, a head portion, and a pointed tip portion, and wherein further, each one of said shank portions of each one of said plurality of brad-type fasteners has a substantially oval-shaped cross-sectional configuration as defined by means of a widthwise dimension W and a heightwise dimension H wherein the aspect ratio A/R of each one of said brad-type fasteners, as defined by means of the ratio of said widthwise dimension W to said heightwise dimension H, is >1;
   a power tool having a magazine section for housing said plurality of brad-type fasteners; and
   means for driving each one of said plurality of brad-type fasteners out from said magazine section of said power tool with a predetermined velocity, within the range of 1000-2500 in/sec, such that each one of said plurality of brad-type fasteners can be installed within the relatively thin-gauge sheet metal members without effectively damaging the relatively thin-gauge sheet metal members so as not to compromise the holding power and pull-out resistance of each one of said brad-type fasteners installed within the relatively thin-gauge sheet metal members.

2. The system as set forth in claim 1, wherein:
   each one of said plurality of brad-type fasteners has a chisel-type pointed tip configuration for piercing and penetrating each one of the relatively thin-gauge sheet metal members.

3. The system as set forth in claim 2, wherein:
   each one of said shank portions of each one of said plurality of fasteners, having said substantially oval-shaped cross-sectional configuration, is defined by said widthwise dimension W which extends between laterally separated, opposite end portions, and said heightwise dimension H which extends between oppositely disposed, elongated substantially planar parallel side portions;
   wherein said aspect ratio A/R of each one of said plurality of fasteners, as defined by means of said ratio of said widthwise dimension W to said heightwise dimension H, is >1, such that when said chisel-type pointed tip of each one of said plurality of fasteners pierces and penetrates each one of the relatively thin-gauge sheet metal members, said chisel-type pointed tip of said fastener will cause oppositely disposed tang members to be generated within the relatively thin-gauge sheet metal members, while said opposite, laterally separated end portions of said shank portion will cause lateral stretching of the relatively thin-gauge sheet metal members so as to cause the tang members to engage and grab said oppositely disposed, elongated substantially planar parallel side portions of said shank portion.

4. The system as set forth in claim 1, wherein:
   said aspect ratio A/R, which is >1, is 1.13.

5. The system as set forth in claim 1, further comprising:
   adhesive coating means disposed upon external surface areas of said shank portion of each one of said plurality of brad-type fasteners for effectively lubricating said shank portion of each one of said plurality of brad-type fasteners as each one of said plurality of brad-type fasteners is installed within the relatively thin-gauge sheet metal members, and for adhesively bonding with the relatively thin-gauge sheet metal members after installation of each one of said plurality of brad-type fasteners within the relatively thin-gauge sheet metal member so as to enhance the holding power and pull-out resistance of each one of said plurality of brad-type fasteners with respect to the relatively thin-gauge sheet metal members.

6. The system as set forth in claim 1, further comprising:
   magnetized paint means electro-deposited upon external surface areas of said shank portion of each one of said plurality of brad-type fasteners for effectively forming a mechanical bond between said shank portion of each one of said plurality of brad-type fasteners and the relatively thin-gauge sheet metal members after installation of each one of said plurality of fasteners within the relatively thin-gauge sheet metal member so as to enhance the holding power and pull-out resistance of each one of said plurality of brad-type fasteners with respect to the relatively thin-gauge sheet metal members.

7. The system as set forth in claim 1, wherein:
   each one of said plurality of brad-type fasteners comprises a non-heat-treated fastener.

8. The system as set forth in claim 1, wherein:
   each one of said plurality of brad-type fasteners effectively comprises a dual-width fastener wherein said shank portion of each one of said plurality of brad-type fasteners has a substantially oval-shaped cross-sectional configuration, as defined by means of a widthwise dimension W and a heightwise dimension H, wherein the aspect ratio A/R of each one of said brad-type fasteners, as defined by means of the ratio of said widthwise dimension W to said heightwise dimension H, is >2.

9. The system as set forth in claim 8, wherein:
   said aspect ratio A/R of each one of said dual-width fasteners, which is >2, is 2.26.

10. The system as set forth in claim 8, wherein:
    each one of said plurality of dual-width fasteners comprises a single shank portion, a single head portion, and a single faceted tip portion upon each side of said single shank portion.

11. The system as set forth in claim 8, wherein:
    each one of said plurality of dual-width fasteners comprises a single shank portion, a single head portion, and a dual faceted tip portion upon each side of said single shank portion.

12. The system as set forth in claim 8, wherein:
    each one of said plurality of dual-width fasteners comprises a single shank portion, a single head portion, a dual faceted tip portion upon each side of said single shank portion, and a longitudinally extending groove disposed upon each side of said shank portion and extending between said single head portion and said dual-faceted tip portion so as to effectively divide said single shank portion into dual shank portions.

13. The system as set forth in claim 8, wherein:

each one of said plurality of dual-width fasteners comprises a pair of single-width fasteners comprising a single shank portion, a single head portion, and a single tip portion, and wherein said pair of single-width fasteners are fixedly attached together such that each one of said dual-width fasteners comprises a pair of shank portions, a pair of head portions, a dual faceted tip portion upon each side of said dual-width fastener, a longitudinally extending groove effectively being defined upon each side of said fastener at the interface at which said single shank portions are fixedly attached together.

14. The system as set forth in claim 8, further comprising:

driver blade means disposed within said power tool and having a width dimension which substantially corresponds to said widthwise dimension of said dual-width fastener so as to properly engage said dual-width fastener and drive said dual-width fastener through and out from said magazine section of said power tool.

15. A fastening system for fastening relatively thin-gauge sheet metal members, comprising:

at least one relatively thin-gauge sheet metal member;

a plurality of brad-type fasteners to be installed within said at least one relatively thin-gauge sheet metal member, wherein each one of said plurality of brad-type fasteners comprises a shank portion, a head portion, and a pointed tip portion, and wherein further, each one of said shank portions of each one of said plurality of brad-type fasteners has a substantially oval-shaped cross-sectional configuration as defined by means of a widthwise dimension W and a heightwise dimension H wherein the aspect ratio A/R of each one of said brad-type fasteners, as defined by means of the ratio of said widthwise dimension W to said heightwise dimension H, is >1;

a power tool having a magazine section for housing said plurality of brad-type fasteners; and means for driving each one of said plurality of brad-type fasteners out from said magazine section of said power tool with a predetermined velocity, within the range of 1000-2500 in/sec, such that each one of said plurality of brad-type fasteners can be installed within said at least one relatively thin-gauge sheet metal member without effectively damaging said at least one relatively thin-gauge sheet metal member so as not to compromise the holding power and pull-out resistance of each one of said brad-type fasteners installed within said at least one relatively thin-gauge sheet metal member.

16. The fastening system as set forth in claim 15, wherein:

said at least one relatively thin-gauge sheet metal member comprises a relatively thin-gauge sheet metal member which is to be fixedly incorporated within a structural system selected from the group comprising interior wall structural frameworks, ductwork, and heating, ventilation, and air-conditioning (HVAC) systems.

17. The system as set forth in claim 15, wherein:

said at least one relatively thin-gauge sheet metal member comprises a relatively thin-gauge sheet metal member which has a gauge thickness value which is within the range of 14-25.

18. The system as set forth in claim 15, wherein:

each one of said plurality of brad-type fasteners has a chisel-type pointed tip configuration for piercing and penetrating said at least one relatively thin-gauge sheet metal member.

19. The system as set forth in claim 15, wherein:

said aspect ratio A/R, which is >1, is 1.13.

20. The system as set forth in claim 15, wherein:

each one of said shank portions of each one of said plurality of brad-type fasteners, having said substantially oval-shaped cross-sectional configuration, is defined by said widthwise dimension W which extends between laterally separated, opposite end portions, and said heightwise dimension H which extends between oppositely disposed, elongated substantially planar parallel side portions;

wherein said aspect ratio A/R of each one of said plurality of brad-type fasteners, as defined by means of said ratio of said widthwise dimension W to said heightwise dimension H, is >1, such that when said chisel-type pointed tip of each one of said plurality of brad-type fasteners pierces and penetrates said at least one relatively thin-gauge sheet metal member, said chisel-type pointed tip of said fastener will cause oppositely disposed tang members to be generated within said at least one relatively thin-gauge sheet metal member, while said opposite, laterally separated end portions of said shank portion will cause lateral stretching of the relatively thin-gauge sheet metal members so as to cause the tang members to engage and grab said oppositely disposed, elongated substantially planar parallel side portions of said shank portion.

21. The system as set forth in claim 15, further comprising:

adhesive coating means disposed upon external surface areas of said shank portion of each one of said plurality of brad-type fasteners for effectively lubricating said shank portion of each one of said plurality of brad-type fasteners as each one of said plurality of brad-type fasteners is installed within said at least one relatively thin-gauge sheet metal member, and for adhesively bonding with said at least one relatively thin-gauge sheet metal member after installation of each one of said plurality of brad-type fasteners within said at least one relatively thin-gauge sheet metal member so as to enhance the holding power and pull-out resistance of each one of said plurality of brad-type fasteners with respect to said at least one relatively thin-gauge sheet metal member.

22. The system as set forth in claim 15, further comprising:

magnetized paint means electro-deposited upon external surface areas of said shank portion of each one of said plurality of brad-type fasteners for effectively forming a mechanical bond between said shank portion of each one of said plurality of brad-type fasteners and said at least one relatively thin-gauge sheet metal member after installation of each one of said plurality of brad-type fasteners within said at least one relatively thin-gauge sheet metal member so as to enhance the holding power and pull-out resistance of each one of said plurality of brad-type fasteners with respect to said at least one relatively thin-gauge sheet metal members.

23. The system as set forth in claim 15, wherein:

each one of said plurality of brad-type fasteners effectively comprises a dual-width fastener wherein said shank portion of each one of said plurality of brad-type fasteners has a substantially oval-shaped cross-sectional configuration, as defined by means of a widthwise dimension W and a heightwise dimension H, wherein the aspect ratio A/R of each one of said plurality of brad-type fasteners, as defined by means of the ratio of said widthwise dimension W to said heightwise dimension H, is >2.

24. The system as set forth in claim 23, wherein:
said aspect ratio A/R of each one of said dual-width fasteners, which is >2, is 2.26.

25. The system as set forth in claim 23, wherein:
each one of said plurality of dual-width fasteners comprises a single shank portion, a single head portion, and a single faceted tip portion upon each side of said single shank portion.

26. The system as set forth in claim 23, wherein:
each one of said plurality of dual-width fasteners comprises a single shank portion, a single head portion, and a dual faceted tip portion upon each side of said single shank portion.

27. The system as set forth in claim 23, wherein:
each one of said plurality of dual-width fasteners comprises a single shank portion, a single head portion, a dual faceted tip portion upon each side of said single shank portion, and a longitudinally extending groove disposed upon each side of said shank portion and extending between said single head portion and said dual-faceted tip portion so as to effectively divide said single shank portion into dual shank portions.

28. The system as set forth in claim 23, wherein:
each one of said plurality of dual-width fasteners comprises a pair of single-width fasteners comprising a single shank portion, a single head portion, and a single tip portion, and wherein said pair of single-width fasteners are fixedly attached together such that each one of said dual-width fasteners comprises a pair of shank portions, a pair of head portions, a dual faceted tip portion upon each side of said dual-width fastener, a longitudinally extending groove effectively being defined upon each side of said fastener at the interface at which said single shank portions are fixedly attached together.

29. The system as set forth in claim 23, further comprising:
driver blade means disposed within said power tool and having a width dimension which substantially corresponds to said widthwise dimension of said dual-width fastener so as to properly engage said dual-width fastener and drive said dual-width fastener through and out from said magazine section of said power tool.

* * * * *